United States Patent
Nicol

(10) Patent No.: US 11,997,203 B2
(45) Date of Patent: *May 28, 2024

(54) SYSTEMS AND METHODS FOR PRIVACY PRESERVING ACCURATE ANALYSIS OF NETWORK PATHS

(71) Applicant: Network Perception, Inc., Champaign, IL (US)

(72) Inventor: David M. Nicol, Champaign, IL (US)

(73) Assignee: Network Perception, Inc., Champaign, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/133,808

(22) Filed: Apr. 12, 2023

(65) Prior Publication Data
US 2023/0254144 A1 Aug. 10, 2023

Related U.S. Application Data

(63) Continuation of application No. 17/157,542, filed on Jan. 25, 2021, now Pat. No. 11,658,818, which is a (Continued)

(51) Int. Cl.
*H04L 9/14* (2006.01)
*G06F 16/27* (2019.01)
(Continued)

(52) U.S. Cl.
CPC ............. *H04L 9/14* (2013.01); *G06F 16/27* (2019.01); *H04L 9/0894* (2013.01);
(Continued)

(58) Field of Classification Search
CPC ..... H04L 9/14; H04L 9/0894; H04L 63/0421; H04L 63/062; H04L 63/1433; H04L 63/0823; H04L 2463/061; G06F 16/27
See application file for complete search history.

(56) References Cited

U.S. PATENT DOCUMENTS 7,058,718 B2   6/2006   Fontes et al.
8,824,678 B2   9/2014   Ochikubo et al.
(Continued)

FOREIGN PATENT DOCUMENTS

EP   1993301        11/2008
EP   2735985 B1    12/2017

OTHER PUBLICATIONS

International Search Report and Written Opinion from the International Searching Authority prepared by the USPTO in connection with PCT/US2018/055963, dated Dec. 3, 2018, 12 pages.
(Continued)

*Primary Examiner* — Christopher A Revak
(74) *Attorney, Agent, or Firm* — Denise L. Mayfield; DYKEMA GOSSETT PLLC

(57) ABSTRACT

Anonymizing systems and methods comprising a native configurations database including a set of configurations, a key management database including a plurality of private keys, a processor in communication with the native configurations database and the key management database, and a memory coupled to the processor. The set of configurations includes one or more textual descriptions and one or more ranges, wherein each range includes a contiguous sequence comprised of IP addresses, port numbers, or IP addresses and port numbers. The processor is configured to retrieve the set of configurations from the native configurations database, wherein the set of configurations includes a plurality of objects; retrieve a private key from the key management database; assign a unique cryptographically secure identity to each object; and anonymize the plurality of objects based on the cryptographically secure identities and the private key. The present system prevents retrieving the textual descriptions and the ranges of the configuration files of the
(Continued)

native configuration database from the anonymized configuration database

17 Claims, 11 Drawing Sheets

Related U.S. Application Data continuation of application No. 16/161,005, filed on Oct. 15, 2018, now Pat. No. 10,903,998.

(60) Provisional application No. 62/572,517, filed on Oct. 15, 2017.

(51) Int. Cl.
*H04L 9/08* (2006.01)
*H04L 9/40* (2022.01)

(52) U.S. Cl.
CPC ........ *H04L 63/0421* (2013.01); *H04L 63/062* (2013.01); *H04L 63/1433* (2013.01); *H04L 63/0823* (2013.01); *H04L 2463/061* (2013.01)

(56) References Cited

U.S. PATENT DOCUMENTS

| | | | |
|---|---|---|---|
| 8,862,537 B1 | 10/2014 | Bruno et al. | |
| 8,924,725 B2 | 12/2014 | Russell et al. | |
| 9,148,775 B2 | 9/2015 | Bowles et al. | |
| 9,270,451 B2 | 2/2016 | Jonas et al. | |
| 9,635,421 B2 | 4/2017 | Tidwell et al. | |
| 9,729,438 B2 | 8/2017 | Broz et al. | |
| 10,903,998 B2 | 1/2021 | Nicol | |
| 10,936,744 B1* | 3/2021 | Trepetin | H04L 63/0421 |
| 11,522,918 B1* | 12/2022 | Wong | H04L 63/20 |
| 11,658,818 B2* | 5/2023 | Nicol | H04L 9/14 |
| | | | 713/168 |
| 2006/0200665 A1 | 9/2006 | Olson et al. | |
| 2007/0289019 A1 | 12/2007 | Lowrey | |
| 2011/0010563 A1 | 1/2011 | Lee et al. | |
| 2015/0244681 A1 | 8/2015 | Blumenfeld et al. | |
| 2017/0171231 A1 | 6/2017 | Reybok, Jr. et al. | |
| 2019/0229905 A1* | 7/2019 | Fan | H04L 63/0407 |
| 2020/0065521 A1 | 2/2020 | Durvasula et al. | |
| 2023/0168825 A1* | 6/2023 | Agrawal | G06F 3/0622 |
| | | | 711/163 |

OTHER PUBLICATIONS

Communication pursuant to Article 94(3) EPC, dated Apr. 11, 2023, in European Application No. 18 866 417.1, 7 pages.

Adam Slagell, et al., "FLAIM: A Multi-Level Anonymization Framework for Computer and Network Logs", arxiv.org, Cornell University Library, 201 OLIN Library Cornell University, Ithaca, NY 14853, Jun. 2006, XP080240944.

Jianqing Zhang, et al., "Outsourcing Security Analysis with Anonymized Logs", Securecomm and Workshops, 2006, IEE, PI, Aug. 1, 1006, pp. 1-9, XP031087509, ISBM 978-1-4244-0422-3.

* cited by examiner

SYSTEMS AND METHODS FOR PRIVACY PRESERVING ACCURATE ANALYSIS OF NETWORK PATHS

CROSS-REFERENCE TO RELATED APPLICATIONS

This application is a continuation of U.S. non-provisional patent application Ser. No. 17/157,542, filed on Jan. 25, 2021, now allowed, which was a continuation of U.S. non-provisional patent application Ser. No. 16/161,005, filed on Oct. 15, 2018, which issued as U.S. Pat. No. 10,903,998 on Jan. 26, 2021, which claimed priority to U.S. provisional patent application Ser. No. 67/572,517, filed Oct. 15, 2017, all of which are hereby incorporated by reference as though fully set forth herein.

BACKGROUND OF THE INVENTION

The present subject matter relates generally to network security. More specifically, the present invention relates to systems and methods for anonymizing IP address configuration files prior to transmission to, and use by, remote-based services to preserve the privacy of the sensitive information typically found in IP configuration files.

Misconfiguration of access policy implementation within firewalls or other local security mechanisms is a major source of security vulnerability and compliance issues. The complex interactions between distributed and layered policy implementation can lead to subtle errors and can mask problems that a tedious manual review of configuration file would certainly miss. Accordingly, it is important to routinely perform comprehensive analysis of firewall, router, and switch configurations to determine connectivity and identify any deviation from security policies, standards, and best-practices as an important line of defense for networks.

Software tools exist to perform such analysis. These tools take as input the native configuration files of firewalls, router forwarding tables, and a baseline access policy description and compute all permitted flows, and, in particular, those flows that deviate from baseline policy.

A potential market exists for access to such tools as a cloud-based (or otherwise remote) service, but a significant barrier exists: the identities of the IP subnetworks (and to a lesser extent the particular ports used for specialized services) are often viewed as sensitive information, as may be the text strings used to name elements of a network topology.

Collectively, the IP addresses provide a roadmap that a cyber-attacker may use to infiltrate the networks. Accordingly, network operators are understandably reluctant to expose their configurations outside their installations. Operators of critical infrastructures (e.g., the electric power grid) are especially reluctant to expose their native configurations.

This appropriate reluctance has made it problematic to use remote-based analysis services that perform comprehensive analysis of firewall, router, and switch configurations to determine connectivity and identify any deviation from security policies, standards, and best-practices. However, it is well-known that there are circumstances in which cloud-based services offer considerable cost-savings.

While it is safe to assume that a user (e.g., network operator) would encrypt configurations prior to transmission to the remote-based analysis service, protection of the configurations in motion is not the problem of interest. The previously unaddressed threat comes from an observer capable of accessing the decrypted configurations while they are being processed in the cloud. Moreover, from this point of view, the cloud-based service itself is an unaddressed threat as it has direct access to the decrypted configurations.

Accordingly, there is a need to provide systems and methods through which cloud-based services can be used while protecting sensitive IP address configuration information.

BRIEF SUMMARY OF THE INVENTION

To meet the needs described above and others, the subject matter disclosed herein provides systems and methods for anonymizing IP address configuration files prior to transmission to, and use by, remote-based services to preserve the privacy of the sensitive information. The systems and methods combine anonymization of the IP address, port, and protocol information with specialized analysis techniques to preserve privacy of the sensitive information. In a primary embodiment, the systems and methods employ an algorithm that anonymizes a collection of ranges so as to preserve "range-intersection" over that collection, the key property needed for performing connectivity analysis. This makes it possible for a user to anonymize all the ranges in configuration files and transmit the anonymized configurations to the remote-based service. There, the connectivity computation is performed, oblivious to the anonymization, yielding results whose IP and port ranges are encoded, as are user provided names (which frequently reference geographic identity) and protocol identities. These are transmitted back to the user and de-anonymized, to obtain exactly the same results as would have been found performing the analysis on the original configuration files.

Using the systems and methods provided herein, remote-based analysis services that perform comprehensive analysis of firewall, router, and switch configurations to determine connectivity and identify any deviation from security policies, standards, and best-practices can be implemented such that the engine that performs the connectivity analysis is oblivious to the anonymization of the data. In other words, the engine processes an anonymized configuration just like it processes a non-anonymized one.

Accordingly, the objectives and advantages of the present subject matter can be accomplished by implementing algorithms on the client side that anonymize the network information found in the configurations, then send the anonymized configuration to the cloud-based server for analysis, which analyzes the anonymized configuration and then returns the anonymized results to client-side system where the anonymized results are de-anonymized. In such an implementation, the cloud-based server has no knowledge of the pre-anonymized IP address, port, and protocol information.

In some examples, the anonymization can be transparent to the user, except for providing a key upon which the anonymization depends.

To support cloud-based storage of anonymized configurations and combining already anonymized system descriptions into a larger anonymized system, the present disclosure also provides algorithms that merge two anonymized system representations using only public information about the systems being merged, while protecting the anonymizations.

As described above, the systems and methods provided herein, remote-based analysis services that perform comprehensive analysis of firewall, router, and switch configurations to determine connectivity and identify any deviation from security policies, standards, and best-practices. Connectivity analysis is focused on ranges, i.e., contiguous sequences of IP addresses, and contiguous sequences of port numbers. The basic operation in the analysis is to take a selected subnetwork as the source and selected subnetwork as the destination and find all flows the configurations permit from the source to the destination. A source range represents a set of potential hosts, as does the destination range. A variation is to use a wildcard for the destination and find all flows from the source to anywhere else. A wildcard is a range that allows anything to pass through, and appears in most positions of the IP header in the initial meta-packet. The source and destination subnets are usually represented as CIDR blocks, but the systems and methods provided herein view the source and destination subnets as ranges of integers. The analysis takes a source-range/destination-range pair and creates a meta-packet where addresses and port numbers are ranges (or wildcards) and the protocol is specified (or a set of protocols is specified) and "pushes" that through the system, starting from the source network. The logic applied to meta-packets is similar to logic applied to individual packets (e.g. passing through access control rules, being routed, having NAT transformations applied), but each of these steps may fragment a meta-packet into multiple meta-packets (whose address and port ranges are subsets of the original), each of which is pushed along individually towards the destination network. The result of the computation is a set of meta-packets that actually reach the destination, each of which we call a "path".

Oblivious analysis is possible when path-discovery computation is performed on an anonymized meta-packet and produces a set of paths such that de-anonymization of the ranges in those paths produces exactly the same set of paths as are computed from the same non-anonymized meta-packet, and each path begins at exactly the same source subnet, follows exactly the same sequence of devices, passes through exactly the same set of access control rules, has exactly the same routing decisions made and exactly the same NAT rules applied, and reaches exactly the same subnetworks.

One key to the systems and methods described herein is the observation that the rules applied to IP packet headers are based on whether the source IP address falls within some range of IP addresses, whether the source port address falls within some range of port numbers, whether the destination IP address falls within some range of IP addresses and whether the destination port number falls within some range of port numbers. For access control, for routing, and for network address translation, the determination of whether a rule applies, or which rule applies, to the header depends on the inclusion, or not, of the header's individual numbers in the rules' match ranges. Applied to meta-packets, the system can determine what subset of meta-packets are matched by a given rule by taking the intersection of the meta-packet's source IP range with the source IP range specified by the rule, the intersection of the meta-packet's source port range with the source port range specified by the rule, the intersection of the meta-packet's destination range with the destination range of the rule, the intersection of the meta-packet's destination port range with the destination port range of the rule, and check whether the protocol identified by the rule matches the set of protocols carried by the meta-packet. If every intersection and comparison is non-empty, then the meta-packet defined by those intersections (and protocol match) identifies all the packets from the meta-packet that are matched by the rule. Therefore, anonymization that preserves the structure of intersections (i.e., range-intersection preserving anonymization) is important to the integrity of the systems and methods provided herein. Accordingly, the primary object of the subject matter provided herein is to structure the connectivity analysis in such a way that de-anonymization of paths produces the desired result.

Those skilled in the art will recognize the range of embodiments in which the present subject matter may be employed. For purposes of illustrating the scope and range of the systems and methods to those skilled in the art, two main examples are provided.

In a first example, the native configurations representing a system are first converted into a system representation and the system representation is anonymized. The conversion of native configurations into system representation is done on the client (private) side of the system and the anonymization is then performed on the system representation. In the second example, the native configurations are directly anonymized (on the client side), and the transformation of anonymized configurations into an anonymized system representation is performed on the server side. The technical advantage of the second embodiment is that considerably less code is needed on the client side to anonymize individual configuration files, leaving more of the overall system in the cloud for maintenance and updates that require no interaction with the client user. Each of these examples is described in further detail below with respect to the figures.

In one embodiment of the invention, an anonymizing system includes a native configurations database including a set of configurations, a key management database including a plurality of private keys, a processor in communication with the native configurations database and the key management database, and a memory coupled to the processor configured to store program instructions executable by the processor. The set of configurations includes one or more ranges, wherein each range includes a contiguous sequence comprised of IP addresses, port numbers, or IP addresses and port numbers. The processor is configured to retrieve the set of configurations from the native configurations database, wherein the set of configurations includes a plurality of objects, and retrieve a private key from the key management database, wherein the private key is associated with the set of configurations. The processor is further configured to assign a unique cryptographically secure identity to each object, each identity derived from the private key, and anonymize the plurality of objects based on the cryptographically secure identities and the private key.

In some embodiments, each range includes one or more of a set of potential hosts, a destination IP address, a source port, and a destination port. Further, in some embodiments, the step of anonymizing the representation includes assigning a rule-table to the set of configurations, wherein the rule-table includes a plurality of rules that are position-insensitive. In still some embodiments, each range of the anonymized representation includes the same number of members as the corresponding original range. The plurality of ranges may be fragmented.

In other embodiments, the step of anonymizing the representation includes the steps of creating a list of range endpoints, sorting the list of range endpoints, and computing, for each endpoint, a set of ranges that contain the endpoint but do not begin or end at the endpoint. Further, in some embodiments, the anonymizing system may apply an offset to the set of ranges. In some embodiments, the processor is configured to generate a public key that describes the range sizes of each object based on the object's cryptographically secure identity.

In another embodiment of the present invention, the anonymizing system further includes a remote anonymized systems database, and the processor is configured to build a representation including a plurality of objects, assign a unique cryptographically secure identity to each object in the representation, each identity derived from the private key, and transmit the anonymized representation to the remote anonymized systems database.

The anonymization system may include a remote anonymized analysis results database and a remote oblivious analysis engine in communication with remote anonymized systems database and the remote database of anonymized analysis results, with a further processor configured to receive user input to generate an anonymized analysis of the anonymized representation, retrieve, by the remote oblivious analysis engine, the anonymized representation from the remote anonymized systems database, analyze the anonymized representation to develop anonymized analysis results, and store the anonymized analysis results in the remote anonymized analysis results database.

In a further embodiment, the anonymizing system may further include a remote anonymized configurations database, wherein the processor is configured to transmit the anonymized plurality of objects to the remote anonymized configurations database. The system may also include a remote anonymized analysis results database and a remote oblivious analysis engine in communication with remote anonymized systems database and the remote database of anonymized analysis results, with a further processor configured to receive user input to generate an anonymized analysis of the anonymized representation, retrieve, by the remote oblivious analysis engine, the anonymized plurality of objects from the remote anonymized configurations database, build a representation based on the anonymized plurality of objects, assign a unique cryptographically secure identity to each object in the representation, each identity derived from the private key; and transmit the anonymized representation to the remote anonymized systems database. The processor may be programmed with computer instruction that cause it to retrieve the anonymized representation from the remote anonymized systems database, analyze the anonymized representation to develop anonymized analysis results, and store the anonymized analysis results in the remote anonymized analysis results database.

Finally, the anonymizing system of the present application may include further program instructions that cause the processor to generate a de-anonymization key and store the de-anonymization key in the key management database. Further, the processor may be configured to receive user input to de-anonymize the anonymized analysis results, receive, from the remote anonymized analysis results database, the anonymized analysis results and the de-anonymization key from the key management database, invert the anonymization performed on the representation, and present the de-anonymized results to the user.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1:
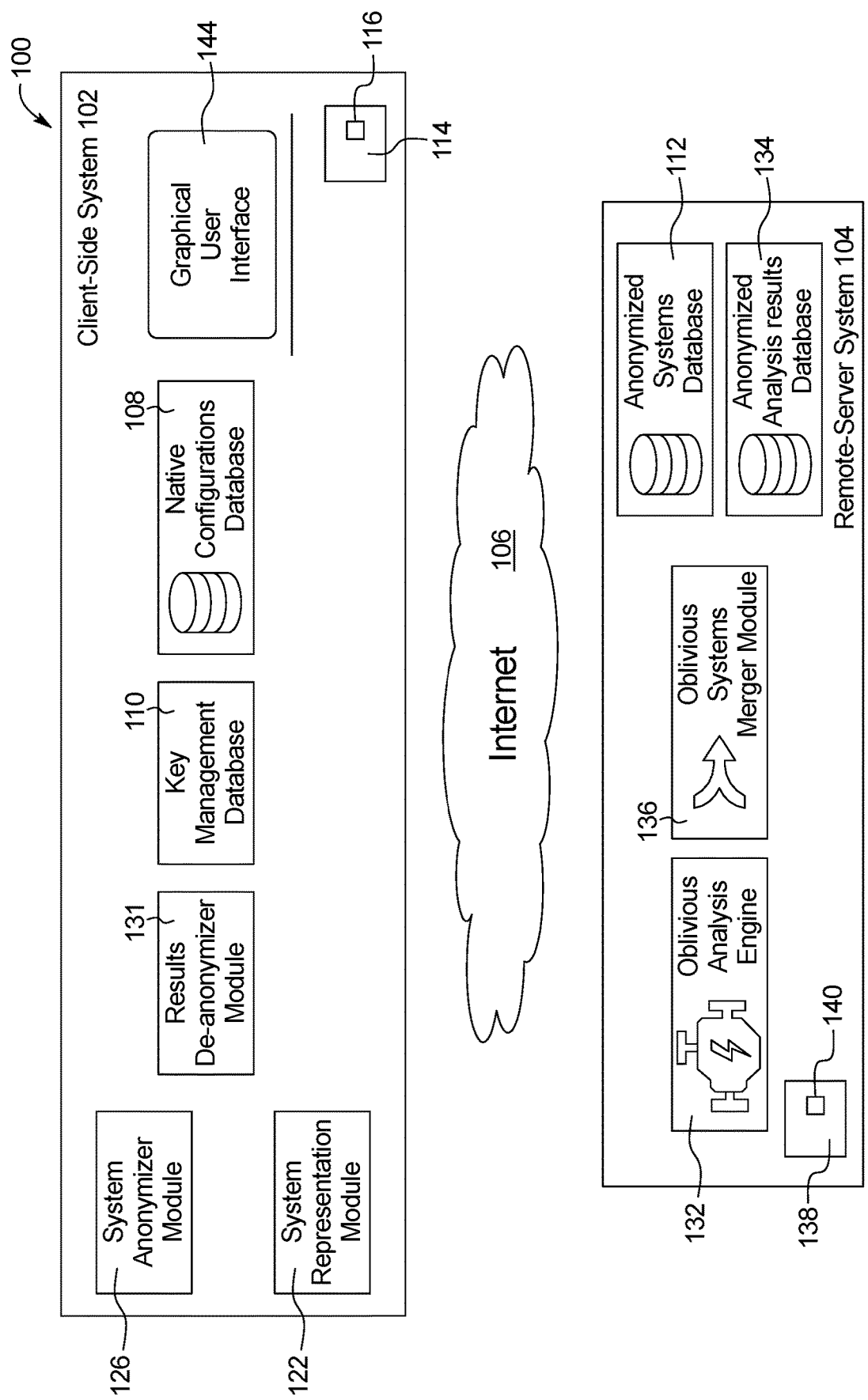
FIG. 1 is a schematic representation of an example of components of a first anonymizing system.

FIGS. 1-5 illustrate components of an anonymization system 100. In the schematic shown in FIG. 1, the anonymization system 100 includes a client-side system 102 and a remote server system 104 that communicate via the internet 106, although any suitable communication means may be used.

Generally, all contiguous ranges of IP addresses and contiguous ranges of ports referenced in the file can be identified by analyzing a configuration or system representation. The anonymization technique of the anonymization system (described in greater detail below) identifies all connected ranges, and then constructs a translation of each connected range by finding an integer value used to shift the range, which can be easily inverted. By describing the matching of a rule-table to an IP packet header in terms of intersections, it is easily shown that a given IP packet header matches the rangers described in a rule if and only if the values of the packet header, when anonymized, match the ranges described in the rule under the same anonymization.

In the illustrated embodiment, the anonymization system 100 includes a native configurations database 108 including a set of configurations, a key management database 110 including a plurality of private keys, and a remote anonymized systems database 112. A processor 114 is in communication with the native configurations database 108 and the key management database 110, and includes a memory 116 configured to store program instructions executable by the processor 114 that, when executed cause the processor 114 to undertake certain steps to anonymize a set of data.

Figure 2:
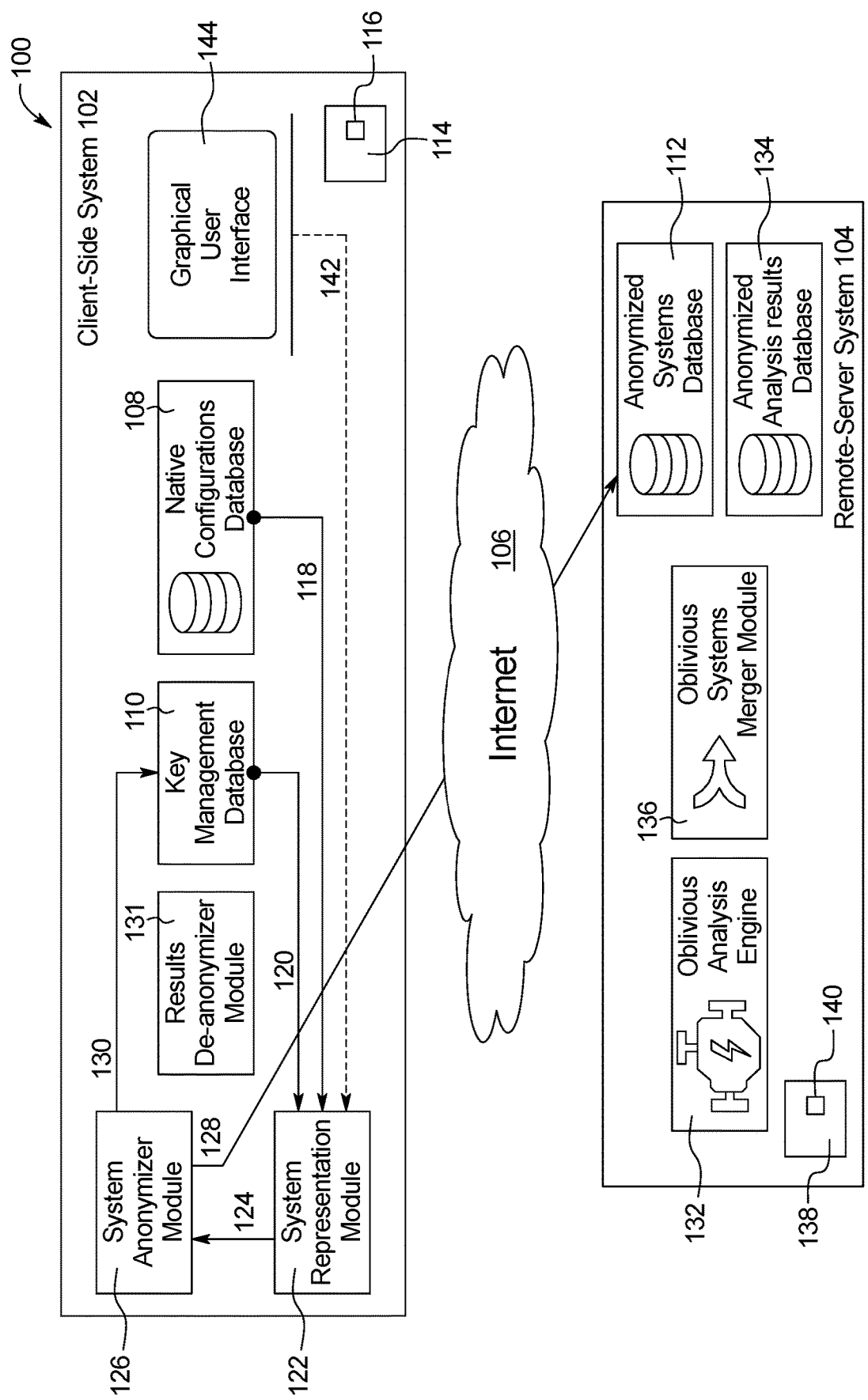
FIG. 2 is a schematic representation of the anonymizing system of FIG. 1 anonymizing a system representation.

More specifically, the anonymizing system 100 performs a method of anonymizing data. Referring to FIG. 2, the system 100 first retrieves a set of configurations 118 from the native configurations database 108 and a private key 120 from the key management database 110. In the illustrated embodiment, a system representations module 122 retrieves the set of configurations 118 and the private key 120 in order then build a representation 124 comprised of a plurality of objects and assigns a unique cryptographically secure identity to each object in the representation 124, each identity being derived from the private key. In the illustrated embodiment, the representation 124 is transmitted to a system anonymizer module 126, which then anonymizes the representation 124 based on the cryptographically secure identities and the private key. The system 100 finally transmits the anonymized representation 128 to the remote anonymized systems database 112. The system anonymizer also generates a de-anonymization key 130 that is stored in the key management database 110 and used by a de-anonymization module 131 to de-anonymize the final results.

The remote server system 104 includes the anonymized systems database 112, an oblivious analysis engine 132, an anonymized analysis results database 134, and an oblivious systems merger 136. The remote server system 104 may also include a second processor 138 and a second memory 140 including program instructions executable by the second processor 138.

Referring to FIG. 2, the system representations module 122 retrieves a set of set of configurations 118 from the native configurations database 108 and a private key 120 from the key management database 110 upon receipt of instructions 142 from a user via a graphical user interface 144 within the client-side system 102. The set of configurations 118 may include a plurality of ranges including one or more of a set of potential hosts, a destination IP address, a source port, and a destination port. In some embodiments, the plurality of ranges may be fragmented. The systems representation module 122 builds a representation 124 of the set of configurations 118, the representation 124 including a plurality of objects. Each object in the representation 124 is provided a unique cryptographically secure identity derived from the object specification and private key 120. The representation 124 is transmitted to the system anonymizer module 126, which anonymizes the representation 124 based on the cryptographically object identities and the relevant private key 120.

By analyzing a configuration 118 or system representation 124, all contiguous ranges of IP addresses and contiguous ranges of ports referenced in the file can be identified. A range includes contiguous sequences of IP address and contiguous sequences of port numbers. The system 100 identifies a selected source subnetwork or host and finds all flows the configuration allows whose origin is in the source subnetwork. Therefore, a source range includes a set of potential hosts, typically Classless Inter-Domain Routing blocks, which can be viewed as a range. The system generates a meta-packet based on a source subnetwork description, where the source IP address is the range of IP addresses in the originating subnetwork, and wild-card integer ranges for the destination IP address, the source port, and the destination port. In some embodiments, special cases of IP ranges that have special meaning and should not be anonymized, such as well-known private address spaces and multicast address spaces.

As the meta-packets are pushed through the network description, the logic applied is similar to logic applied to individual packets. However, each step may fragment a meta-packet into multiple meta-packets that include address and port ranges that are subsets of the original ranges. Each meta-packet that reaches the destination is referred to as a "flow."

For an anonymization of a meta-packet that produces a set of flows, the de-anonymization of the ranges in those flows will produce exactly the same set of flows as are computed from the same non-anonymized meta-packet, which each flow having followed exactly the same sequence of devices, having been admitted by exactly the same set of access control rules, and having had exactly the same routing decisions made and have exactly the same NAT rules applied.

The routing of packet information typically involves the application of a rule-table to an IP packet header. The IP packet header specifies integer values for the source and destination IP addresses, the source and destination port numbers, and the protocol. Each firewall applies a rule-table to the IP packet header in order to determine whether to admit the packet and transform part of the packet through Network or Port Address Translation. Similarly, each router applies a rule-table to determine whether to route the packet. For a five-dimensional IP packet header, a rule-table includes five-dimensional matching conditions. The matching conditions can be exact values or ranges in terms of specifying a union of intervals. Example applications of rule-tables to two IP packet headers are provided below to illustrate matching and non-matching conditions.

| packet header | condition | matching? |
| --- | --- | --- |
| (130.126.151.36, 21790, 192.17.90.136, 443, | (*, *, 192.17.90.0/24 443, 6) | match |
| (130.126.151.36, 21790, 192.17.90.136, 443, | (*, *, 192.17.90.0/24, 110, 6) | no match |

The range field of a meta-packet resulting from a match is marked as "shaped" if the range in that field of the rule is from a known space is and is not a wildcard. The distinction is important in the logic for computing precisely which flows are presented to a rule. For a list of rules R1, R2, ... Rn, and a meta-packet P, the logic is to take the intersection of P's fields with R1's fields, and siphon off the meta-packet which intersects R1 in all dimensions. The residual flow P/R1 (i.e., P excluding R1) is logically the set of meta-packets which are intersected with R2. These reflect the exclusion of R1, and the set of meta-packets presented to R3 will represent the exclusion of both R1 and R2. To support anonymization, the exclusions applied to unshaped ranges are not computed, but instead are carried along symbolically. When a meta-packet is discovered to be a path, one or more of its dimensions may be unshaped. If there are exclusions, these are necessarily from known (anonymized) space and are represented symbolically, which means that to correctly identify the ranges of unknown space represented as a course or destination, de-anonymization needs to be applied only to the exclusions.

The action applied to a packet depends on which rules match, their position in the table, and sometimes the size of the ranges encoded in the rule's matching conditions. For example, in many firewalls the action applied to a packet is that action associated with the rule among all possible matches which appears earliest in a sequential representation of the rule-table. In some other cases such as a BSD firewall, it is the last rule among all possible matches in the table that determines the action, unless there is a match with an earlier rule designated as being "quick." In the case of a router's forwarding table, the matching rule which defines the routing applied may be the rule whose matching condition is smallest.

In the anonymization system 100, the rule which defines the action applied to the packet is (1) among a set of matching rules whose matching conditions have non-empty intersection with the packet in the corresponding dimensions, and (2) the algorithm for selecting among all matching rules depends in no way on the specific values of the ranges in those rule's matching conditions. Therefore, each rule-table and the algorithm for selecting among matching rules is position-insensitive. For example, if P is a computer program whose inputs include ranges of integers and I is a subset of those ranges, P is "position-insensitive" on I if any branching decision that depends on I is the same for multiple positionings of the range in the domain.

Within the IP space, a range [a, b] is related to range [c, d] if those ranges have a non-empty intersection. Ranges may be aggregated into disjoint "connected" sets where all ranges in a connected set are related by the transitive closure of the "intersects" relations. A connected set can be described by a "super-range' [A, B] where any member of the connected set is a subset of [A, B]. Obviously, if each of [a, b] and [c, d] is contained in [A, B], then the intersection of [a, b] and [c, d] will be either empty or be in [A, B]. By definition, the connected sets do not intersect. Therefore, if [a, b] is in one connected set and [c, d] is in a different connected set, their intersection is empty.

In some cases, the native configurations contain object group names that are suggestive of geographic region or role of the IP addresses in the group. These group names can be anonymized by using a key to initialize a cryptographically secure random number generator, and either to create completely randomized strings as anonymizations, or to use the random number stream to draw without replacement from a very large dictionary of words (initially randomized itself). The private de-anonymization key provides the inverse mapping.

The anonymizing steps of the present anonymizing system 100 are all position-insensitive, at least with respect to IP ranges being consistent with CIDR alignment. The decisions involved in matching access control rules, routing decisions, and application of NAT transformations are determined by taking intersections of IP and/or port ranges in a position-insensitive fashion. In this way, the anonymization preserves the structure of intersections.

In one embodiment, the anonymization system 100 draws elements from a domain D to anonymize. While a conventional domain D may include non-negative integer representation of IP addresses, it is presumed that all elements of D are ordered with respect to the numerical values of the IP addresses they represent. To define a range on D, Let a, b∈ D. Define [a, b] as a range on D:

$$[a,b]=\{x \in D | a \leq x \leq b\}$$

Not every element in D needs to be anonymized. A subset of ranges I={[$s_1$, $t_1$], [$s_2$, $t_2$], . . . , [$s_n$, $t_n$]} have been extracted or inferred from the configuration to be anonymized, and their union is $D_I$. The anonymization system will anonymize only those x∈ $D_I$.

Presuming an anonymization function φ: $D_I \to D$ on individual elements, ranges on D, can be mapped into subsets of D, by defining $$A_\varphi([u,v])=\{\varphi(x)/\text{for all } x\in[u,v]\}$$

In order to anonymize ranges, analyze the anonymized ranges, and de-anonymize the results, the anonymization range must have the same structure as the original range. More specifically, the image under anonymization is itself a range and has exactly the same number of members as the original. These conditions are necessary for the anonymization steps to be position-insensitive, as the anonymization system and modules within are expecting the structure of ranges and may make control decisions based on the number of elements in that range (even if decisions are not based on the specific values in that range). In this way, the anonymization function φ preserves structure.

More specifically, the anonymization function φ preserves structure if it is one-to-one, and for every [u, v] on $D_I$, $$A_\varphi([u,v])=[\varphi(u),p(v)] \text{ and } \operatorname{card}([u,v])=\operatorname{card}([\varphi(u),\varphi(v)])$$

where card([s, t])=v(t)−v(s)+1 is the cardinality function.

A consequence of an anonymization function φ preserving structure is that ranges which do not overlap in $D_I$ have images under φ which do not overlap. Otherwise φ would not be one-to-one. Furthermore, preservation of structure implies that ranges which are nested in $D_I$ have images that are nested. That is, if [s, t] ⊂ [u, v], then $$A_\varphi([s,t])=[\varphi(s),\varphi(t)] \subset [\varphi(u),\varphi(v)]=A_\varphi([u,v])$$

This means the effect of φ can be viewed globally, in terms of its effect on canonical ranges. In one example, [s, t] on $D_I$ is said to be canonical if there exists no $s' \in D_I$ with $s' < s$ such that [$s'$, t] is a range on $D_I$, nor is there any $t' \in D_I$ with $t < t'$ such that [s, $t'$] is a range on $D_I$. A canonical range is "as big as possible" in $D_I$. Where φ changes a canonical range, it changes every one of its subranges. If φ preserves structure, its effect on $D_I$ has to be that of shifting the canonical ranges around in D so that they do not overlap.

According to one theorem, I is a set of ranges on set D and $D_I$ is their union. R($D_I$) is the set of canonical ranges on $D_I$, and the anonymization function φ: $D_I \to D$ preserves structure. Then, for each [$s_i$, $t_i$]∈ R($D_I$), there exists an integer $\beta_i$ such that:

$$\varphi(x)=v-1(v(x)+\beta i) \text{ for all } x \in [si,ti]$$

To prove the theorem, choose any [$s_i$, $t_i$]∈ R($D_I$), and define $\beta_i$=v (φ($s_i$))−v($s_i$). Now:

$$v(\varphi(si)) = v(si) + (v(\varphi(si)) - v(si)$$
$$= v(si) + \beta i$$

Since v is one-to-one, $v^{-1}$ is applied to both sides of this equation to see that:

$$v^{-1}(v(\varphi(s_i)))=v^{-1}(v(s_i)+\beta_i),$$

or equivalently $\varphi(s_i)=v^{-1}(v\ (s_i)+\beta_i)$. Now choose any x∈ [$s_i$, $t_i$] with $s_i < x$. Because φ preserves structure, $A_{100}$ ([$s_i$,x])= [φ($s_i$), φ(x)]. Furthermore, v(φ(x))−v(φ($s_i$))=v(x)−v($s_i$) because the image of [$s_i$, x] under φ is a range with the same number of elements as [$s_i$, x]. It follows that:

$$v(\varphi(si)) = v(x) + (v(\varphi(si)) - v(si)$$
$$= v(x) + \beta i$$

Applying $v^{-1}$ to both sides gives $\varphi(x)=v^{-1}(v\ (x)+\beta_i)$ as required. □

As shown above, any anonymization function that preserves structure necessarily has the form of "shifting"

canonical ranges within D. If $[s_i, t_i] \in R(D_I)$ is shifted by an offset $\beta_i$, the numerical range $[v(s_i), v(t_i)]$ is shifted by $|\beta_i|$ values, meaning forward if $\beta_i$ is positive and backward if $\beta_i$ is negative.

This proves that if one is going execute the same computer program on anonymized ranges as one would with original ranges, this form is a necessary condition for the anonymization. To be a sufficient condition for proper execution and ability to de-anonymize, the structure preserving anonymization must also preserve range intersections. This means that the anonymization of intersections is the same as the intersection of anonymizations.

Given that $\varphi:D_I \rightarrow D$ is an anonymization function, $\varphi$ preserves range intersections if, for every pair of ranges $[s, t]$, $[u, v]$ on $D_I$, $$A_\varphi([s,t] \cap [u,v]) = A_\varphi([s,t]) \cap A_\varphi([u,v]),$$

taking $A_\varphi(\emptyset) = \emptyset$.

The importance of the idea is clear that when $A_\varphi$ is one-to-one, the anonymization is invertible. Presume that ranges on $D_I$ are initially anonymized and, in the course of things, take the intersection $B = A_{100}([s, t]) \cap A_{100}([u, v])$. If $\varphi$ is range-intersection preserving, then we can recover from the expression of B what the intersection of the pre-anonymized ranges would be, by $A_\varphi^{-1}(B) = A_\varphi^{-1}(A_\varphi([s, t] \cap [u, v])) = [s, t] \cap [u, v]$. This property enables us to de-anonymize the results that the position-insensitive computation on the anonymized ranges produced. The next step is to show that if $\varphi$ preserves structure, then it also preserves range intersection.

According to a second theorem, if $\varphi: D_I \rightarrow D$ is an anonymization function which preserves structure, then $\varphi$ preserves range intersection.

To proof this theorem, let $[s, t]$ and $[u, v]$ be ranges on $D_I$. If $[s, t]$ and $[u, v]$ have non-empty intersection values, they must be subranges of the same canonical range. Since $\varphi$ preserves structure there must exist $\beta$ such that $\varphi$ shifts all members of the image of the canonical range under $v$ by $\beta$. The elements of D are globally ordered, and the shifting of the numerical values corresponding to $[s, t]$ and $[u, v]$ can be envisioned as shifting elements of D along that global ordering, by $|\beta|$ units, towards larger values if P is positive, towards smaller values if $\beta$ is negative. With respect to that order, $A\varphi([s, t])$ shifts $[s, t]$ and $A\varphi([u, v])$ shifts $[u, v]$ exactly $|\beta|$ positions on D. Likewise, if $[x,y]=[s, t] \cap [u, v]$, then $A_\varphi([x,y])$ shifts $[x,y]$ exactly $|\beta|$ positions to align exactly with $A\varphi([s, t]) \cap A\varphi([u, v])$, as required. Now if $[s, t]$ and $[u, v]$ are in the same canonical range but do not intersect, by the same logic, shifting them both in D by the same shift offset $\beta$ implies they will not intersect. Finally, if $[s, t]$ and $[u, v]$ come from different canonical ranges, then because $\varphi$ necessarily keeps the images of canonical ranges from overlapping, the intersection of their respective anonymizations is also empty.

If $D_I$ is anonymized in such a way that the computer program operating on the anonymized ranges can be insensitive to the anonymization, the anonymization must preserve structure, otherwise the anonymized ranges differ in attributes other than just value. Since the anonymization preserves structure, it has a particular form, of shifting canonical ranges about without overlap. It also preserves range intersections, meaning that the results produced by the position-insensitive computation can be de-anonymized. Any anonymization such that the results of position-insensitive computation can be precisely de-anonymized must have the shifting form.

D may comprise an integer or a natural number representation of IP addresses.

In the anonymization of range sets, anonymization consists of assigning offsets $\beta_i$ to the canonical ranges. The offsets are selected to ensure that the anonymized canonical ranges remain separated and leak no information about the values of the pre-anonymized canonical ranges.

Given a set of ranges I, the canonical ranges can be identified in time proportional to n log n, where n is the number of ranges, as follows:

1. In linear time create a list L of range endpoints, $r_1$, $r_2, \ldots, r_m$, where a set $B_i$ of ranges which begin with $r_i$ and a set $T_i$ of ranges that terminate at $r_i$ are associated with each i.
2. Sort L. As there are no more than 2n endpoints, this is accomplished in O(n log n) time.
3. With a linear scan of sorted L that uses the $B_i$ and $T_i$ sets to track precisely which ranges encompass each endpoint r, compute the set of ranges C(r) that contain r but do not begin or end at r for each $r \in L$. Using a range tree data structure, the computation at each r is O(log n).
4. A canonical range is found as $[s, t]$ where C(s) and C(t) are both empty, but C(r) is not empty for every $r \in L$ with $s < r < t$.

Certain details of the algorithm depend on whether the anonymization offsets $\beta_i$ are constrained (as they are with CIDR block addresses) or unconstrained.

In an unconstrained anonymization, taking D to be the natural numbers, let N be the largest value in the IP space to be anonymized (e.g. $N = 2^{32} - 1$ for IPv4 and $N = 2^{64} - 1$ for a user domain space under IPv6), let I be a set of ranges on D to anonymize, and let k be the number of canonical ranges on $D_I$.

Without loss of generality, the least value to which an address can be mapped is 0. There may well be a minimum value below which assignment should not be made, but the descriptions below are easily amended to accommodate this constraint. The goal is to pack all of the canonical ranges starting at the low end of $[0, N]$ in such a way that provides no indication to an observer of what the original location may have been. If canonical ranges were packed in order of their pre-anonymized appearance, the observer would have knowledge that the native position of a canonical range could not appear earlier than its anonymized position. To defeat that kind of information leakage, the canonical ranges may be randomly permutated, with each permutation having the same probability 1/k! of being chosen. Using the Knuth shuffle, this is accomplished in O(k) time. Re-indexing the range endpoints to reflect the permutation, the first canonical range $[s_1, t_1]$ is mapped to $[0, (t_2 - s_1 \; s_1$ with anonymization offset $\beta_1 = -s_1$. This defines $\varphi(s_2) = 0$ and $\varphi(t_2) = (t_1 - s_1)$. The second t range $[s_2, t_2]$ is mapped to $[\varphi(t_2) + 1, \varphi(t_1) + 1 + (t_2 - s_2)]$ with offset $\beta_2 = \varphi(t_1) + 1 - s_2$, so that $\varphi(s_2) = \varphi(t_1) + 1$ and $\varphi(t_2) = \varphi(s_2) + (t_2 - s_2)$, and so on.

In an unconstrained anonymization, IPv4 address ranges usually derive from a CIDR block (e.g. 172.80.8.0/24), and are expressed in the device configurations as CIDR blocks, or as IP addresses with net-masks which are semantically equivalent to CIDR blocks. This constrains the possible anonymization offsets. To anonymize the configuration itself, then a "/24" network in the configuration needs to be transformed into a "/24" network under the anonymization. All CIDR blocks must be remapped to locations that accommodate them, because the starting address of a /d network must have zeros in its 32–d least significant bits. The larger the network, the more zeros the first address must have. With a canonical range, the system finds the CIDR blocks of largest size and ensures that the canonical range is placed to accommodate them. Therefore, if the largest CIDR block with a canonical range is a /d network, then the starting address for the anonymized placement of that CIDR block must have 0 in its 32–d least significant bits. Since the canonical range is a contiguous sequence of IP addresses, ensuring that one of the largest blocks is properly aligned ensures that all the blocks of largest size are aligned and that any smaller blocks are also aligned.

To avoid placing smaller networks in ways that inhibit the placement of larger networks, networks are placed in decreasing severity of constraint. Within a set of canonical ranges with the same maximal CIDR block size, the order of their placement is uniformly at random. Once all constrained placements are made, any remaining unconstrained placements are then made.

1. Classify each canonical range as being constrained if any of its constituent ranges is a CIDR block (two or more addresses), or otherwise unconstrained.
2. Order the constrained canonical ranges in decreasing size of largest constituent CIDR block, and group together canonical ranges whose largest constituent CIDR blocks have the same size. Denote by $G_n$ a group whose defining CIDR block is a /n network.
3. In order of increasing i, randomly permute the members of $G_i$, and pack them one-by-one onto [0, N], beginning at the bottom, in such a way that a network from $G_i$ is aligned so that its /i CIDR sub-ranges are mapped to addresses whose least significant 32–i bits are zero.
4. Left now with only the unconstrained canonical ranges, use the unconstrained algorithm described earlier, packing the unconstrained canonical ranges beginning with the end of the packed constrained canonical ranges.

Anonymization and de-anonymization is very efficient, each operation taking only O(log k) time where k is the number of canonical ranges. Space requirements are also low, just O(k).

In one embodiment, the anonymization key for the anonymization function φ includes a table with two columns, with as many rows as there are canonical ranges. The ranges may appear in order in the table. To anonymize a value or a subrange, one uses binary search on the rows to efficiently find the canonical range which contains it. The second column gives the shift offset for that canonical range, and the anonymization is simply the addition of the offset to the value or to the endpoints of the range.

The de-anonymization is similar, although using a separate key. There number of rows in this key corresponds to the number of canonical ranges, and the anonymized positions of the ranges are given in the first column of each row. Those rows are sorted with respect to those anonymized values. For a given row, the second column is the negated value of the shift offset for the associated canonical range. To determine the de-anonymization of a value or a range, a binary search is performed on the first column to find the corresponding canonical range, then add the negated offset in the second column to the anonymized value, or endpoints of the anonymized range.

A path is represented in terms of the source and destination IP ranges, the source and destination port ranges, set of protocols, and sequence of devices and rules which define the path. All of the ranges involved in the path are either from known space or are unshaped with exclusions from known space. To de-anonymize a range from known space, the anonymizing system retrieves the de-anonymization key for the anonymized range of the connected range that must contain it. The shift offset is associated with the connected range, which when negated and added to the endpoints of an anonymized range translates the anonymized range back to the original range.

Protocols are identified by well-known identifications in an IP header. In some embodiments, a protocol may be substituted with another integer and de-anonymized by reversing the substitute.

The possible state of an observer's knowledge about the non-anonymized ranges with an a priori joint probability distribution. Denoted by $\gamma_i$, the original starting location for the $i^{th}$ range observed in the anonymized configurations. The joint distribution is the set of non-zero probabilities:

$$Pr(a_1, a_2, \ldots, p_n) = Pr\{\gamma_1 = a_1, \gamma_2 = a_2, \ldots, \gamma_n = a_n\}.$$

Denote by $\delta_i$ the starting position of the $i^{th}$ anonymized range, and define $\Delta = (\delta_1, \delta_2, \ldots, \delta_n)$. The question of how knowledge of $\Delta$ impacts the posterior probability of where the canonical ranges are located in the original configurations can be answered by Bayes Theorem.

$$Pr(a_1, a_2, \ldots, p_n | \Delta) = \frac{Pr(\Delta | \gamma_1 = a_1, \gamma_2 = \alpha_2, \ldots, \gamma_n = a_n)Pr(a_1, a_2, \ldots, p_n)}{Pr(\Delta)}$$
$$= Pr(a_1, a_2, \ldots, p_n)$$

because $Pr(\Delta | \gamma_1 = a_1, \gamma_2 = a_2, \ldots, \gamma_n = a_n) = Pr(\Delta)$. This last equivalence follows because placement of the anonymized canonical ranges depend only on their size of their constituent ranges (and this only in the case of constrained ranges); the anonymization is completely independent of the original range's placement. This shows that the anonymization yields no more information about the pre-anonymized ranges beyond what would otherwise be know about their likely distributions.

In the course of anonymizing the representation, a de-anonymization key is created and stored in the key management component. The de-anonymization key identifies for each range object in the original range of integers and the transformed range of integers. A public key that describes the range sizes of each object, indexed by its cryptographically secure identity, is also stored for later use.

Figure 3:
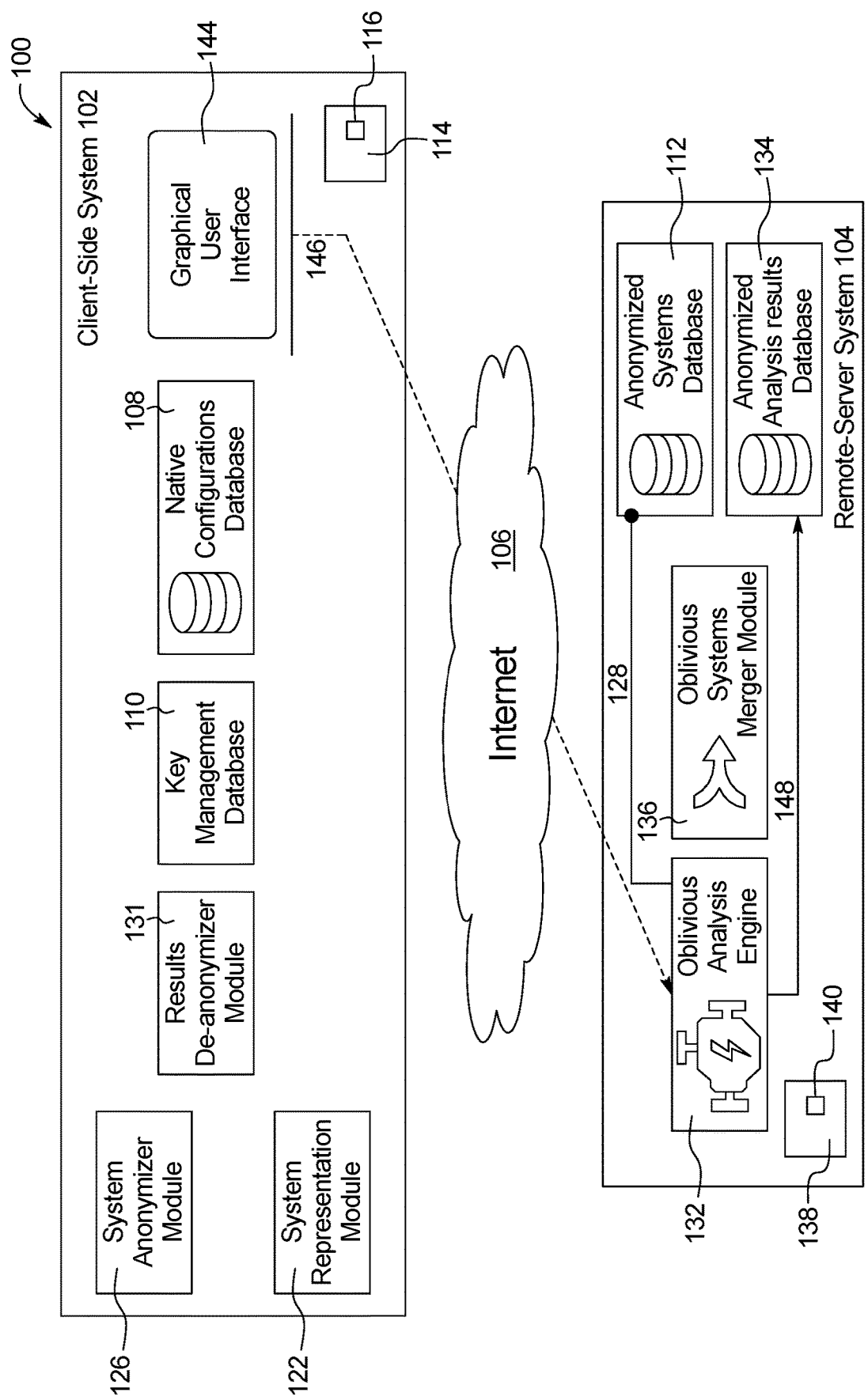
FIG. 3 is a schematic representation of the anonymizing system of FIG. 1 performing an oblivious analysis of the anonymized system representation.

Referring back to FIG. 2, the anonymized representation 128 is transmitted to the remote anonymized systems database 112 on the remote server system 104 once the representation 124 is anonymized. Referring to FIG. 3, input data 146 received by the client-side GUI 144 triggers the specification of the system 100 and other parameters to be analyzed by the oblivious analysis engine 132, which obtains the specific anonymized representation 128 from the remote anonymized systems database 112. The oblivious analysis engine 132 computes the analysis and stores an anonymized analysis results 148 in the anonymized analysis results database 134.

Figure 4:
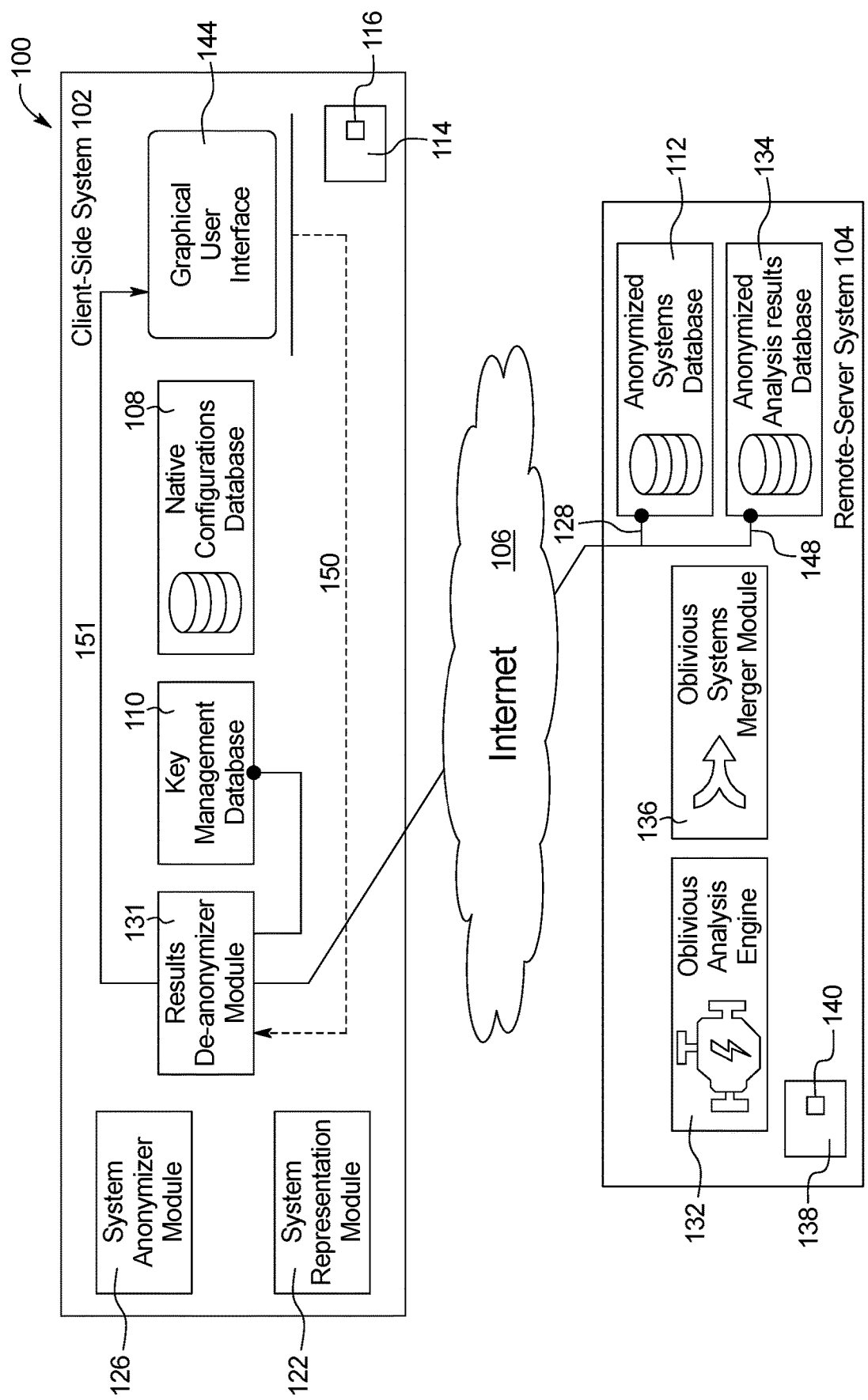
FIG. 4 is a schematic representation of the anonymizing system of FIG. 1 de-anonymizing the results of the oblivious analysis of the anonymized system representation.
Figure 5:
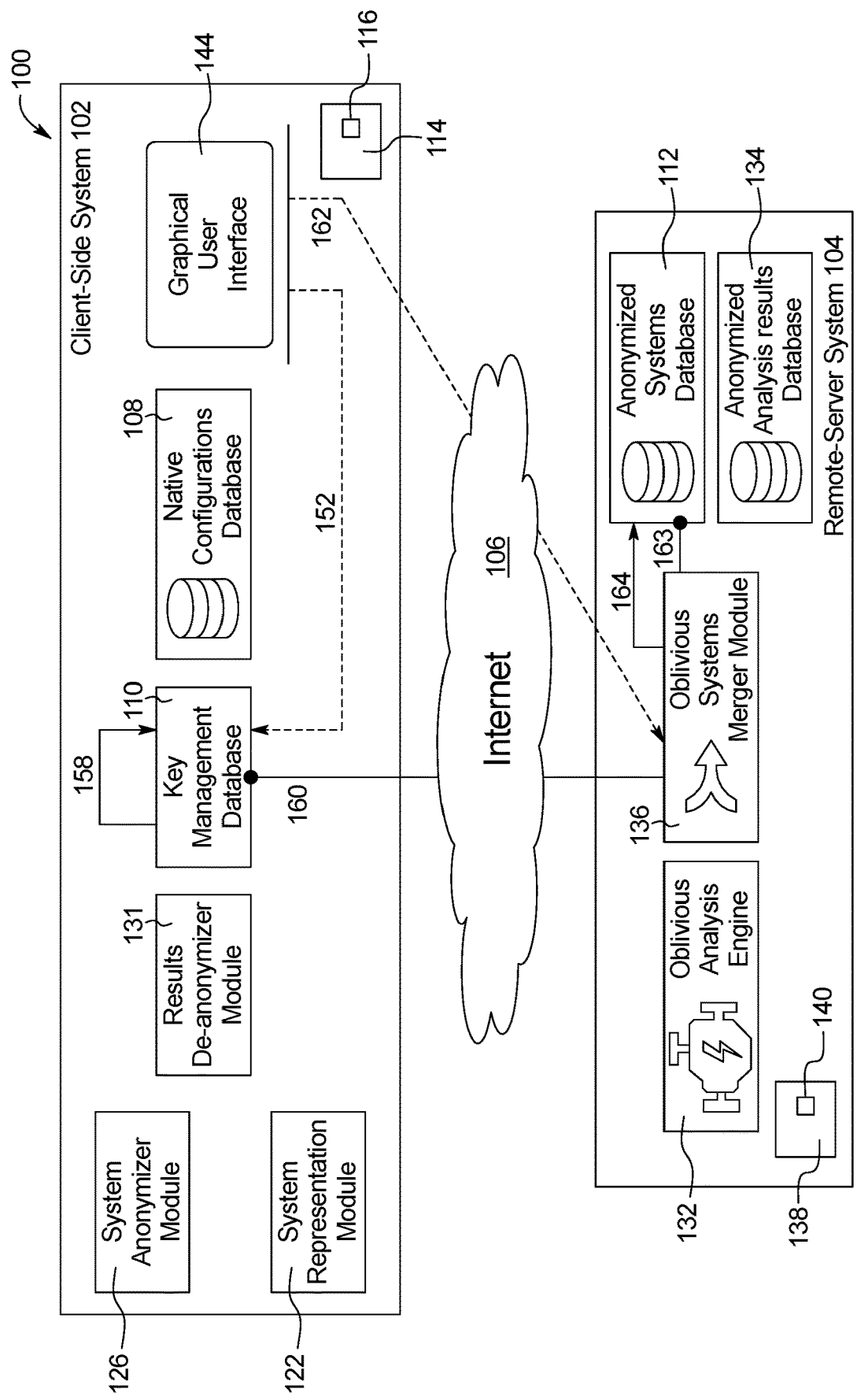
FIG. 5 is a schematic representation of the anonymizing system of FIG. 1 performing an oblivious merge of two anonymized systems into a larger aggregate system.

To de-anonymize the results 148 as shown in FIG. 4, a command 150 is received from the user GUI 144 to perform the de-anonymization. The results de-anonymizer module 131 on the client-side system 102 retrieves the anonymized system representation 128 from the remote anonymized systems database 112, the anonymized analysis results 148 from the anonymized analysis results database 134, and the private de-anonymization key 130 associated with the system representation 124 from the key management database 110. Using the de-anonymization key 130, the results de-anonymizer module 131 inverts the anonymization performed on the ranges of that system representation 124 and presents the de-anonymized results 151 to the user via the GUI 144.

In a further embodiment, the anonymizing system 100 merges two anonymized systems into a larger aggregate system. Upon the receipt of instructions 152 to merge two systems from the GUI, the first and second private keys 154, 156 of first and second sets of configurations, respectively, are merged to produce a private anonymization key 158 for the merged system and a public key 160 that identifies the size of each object. The instructions emitted from the GUI also include a command 162 to an oblivious systems merger module 136 to merge the first and second anonymized representations of the first and second sets of configurations, respectively. The oblivious systems merger module 136 retrieves the first and second anonymized representations 163 and the public key 160 from the key management database 110 and produces a merged anonymized system 164 that is stored on the remote anonymized systems database.

FIGS. 6-11 illustrate a further embodiment of the anonymized system 200 including a client-side system 202 and a remote server side system 204 communicating through the internet 206 or other suitable system. In contrast to the anonymized system 100, the anonymized system 200 directly anonymizes the set of configurations 218 on the client-side server 202, and the step of generating the system representation occurs on the remote server system 204 instead of the client-side system 202. For ease of reference, like reference numbers are used with respect to the embodiment of FIGS. 1-5 and the embodiment of FIGS. 6-11.

Figure 6:
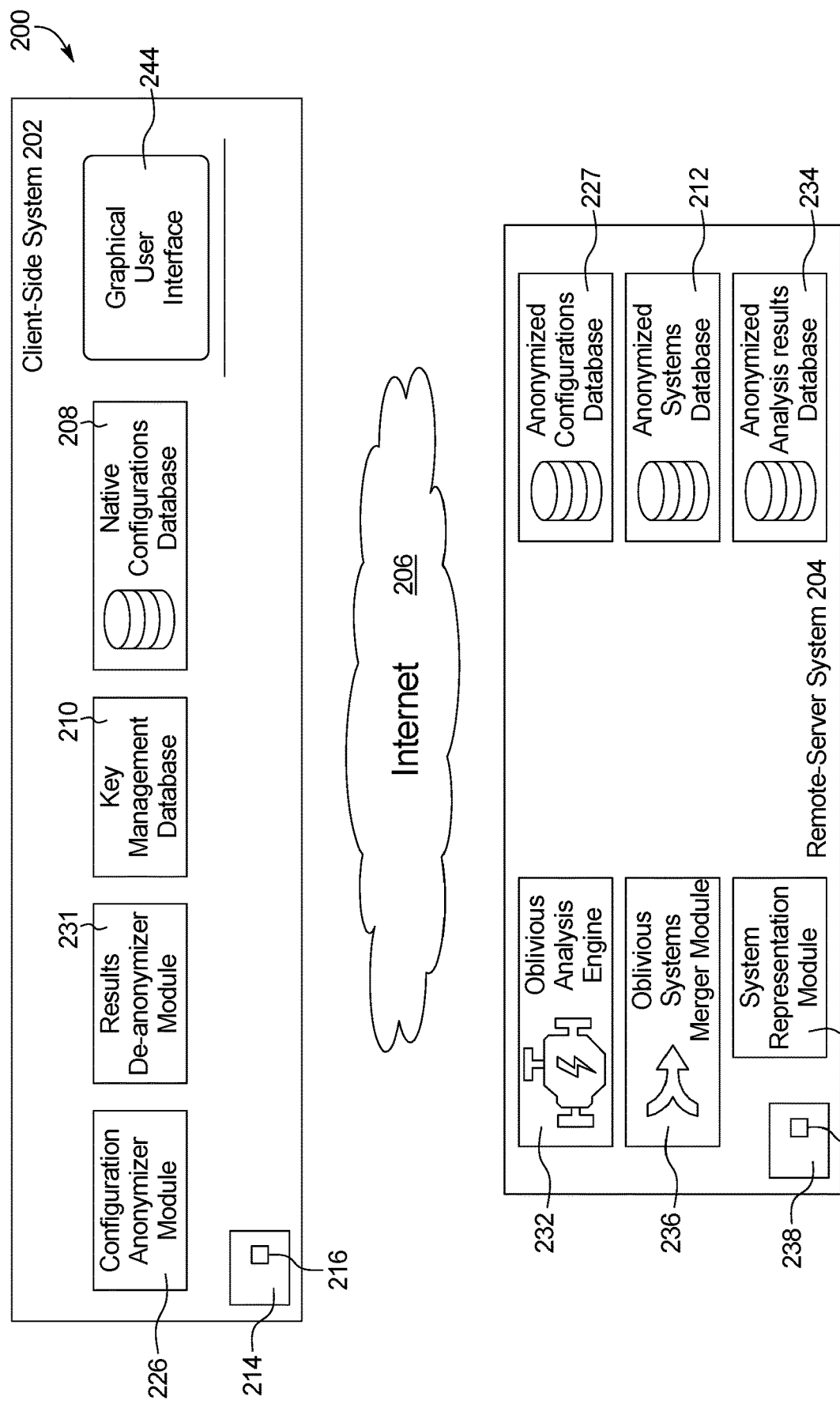
FIG. 6 is a schematic representation of an example of components of a second anonymizing system.
Figure 7:
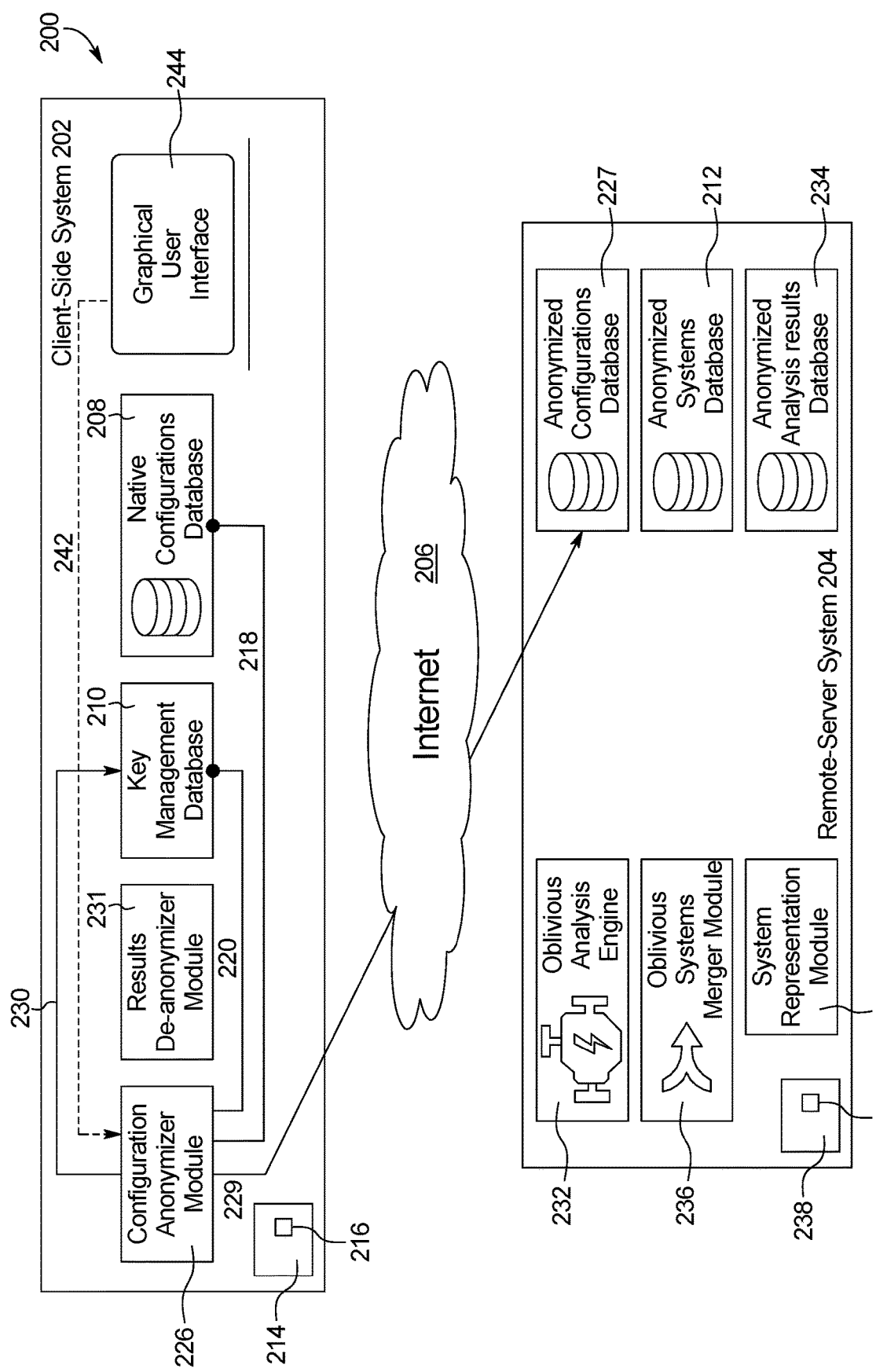
FIG. 7 is a schematic representation of the anonymizing system of FIG. 6 anonymizing a configuration.

Similar to the client-side system 102 within the anonymized system 100, the client-side system 202 includes a native configurations database 208, a key management database 210, a results de-anonymizer module 231, and a first processor 214 as shown in FIG. 6. The client-side server 202 also includes a configuration anonymizer module 226, which retrieves a set of configurations 218 from the native configurations database 208 and a private key 220 from the key management database 210, as shown in FIG. 7. The configuration anonymizer module 226 creates cryptographically secure range object identities (similar to the system anonymizer module 126 of the anonymizing system 100) and applies the transformation directly to the object identities to generate an anonymized configuration 229. The anonymized configuration 229 is transmitted to an anonymized configuration database 227 on the remote server system 104. The configuration anonymizer module 226 also generates a de-anonymization key 230 for storage in the key management database 210.

The remote server system 104 includes a system representation module 222, an anonymized configurations database 227, an anonymized systems database 212, an oblivious analysis engine 232, an anonymized analysis results database 234, and an oblivious systems merger module 236. The remote server system 204 may also include a second processor 238 and a second memory 240 including program instructions executable by the second processor 238.

Figure 8:
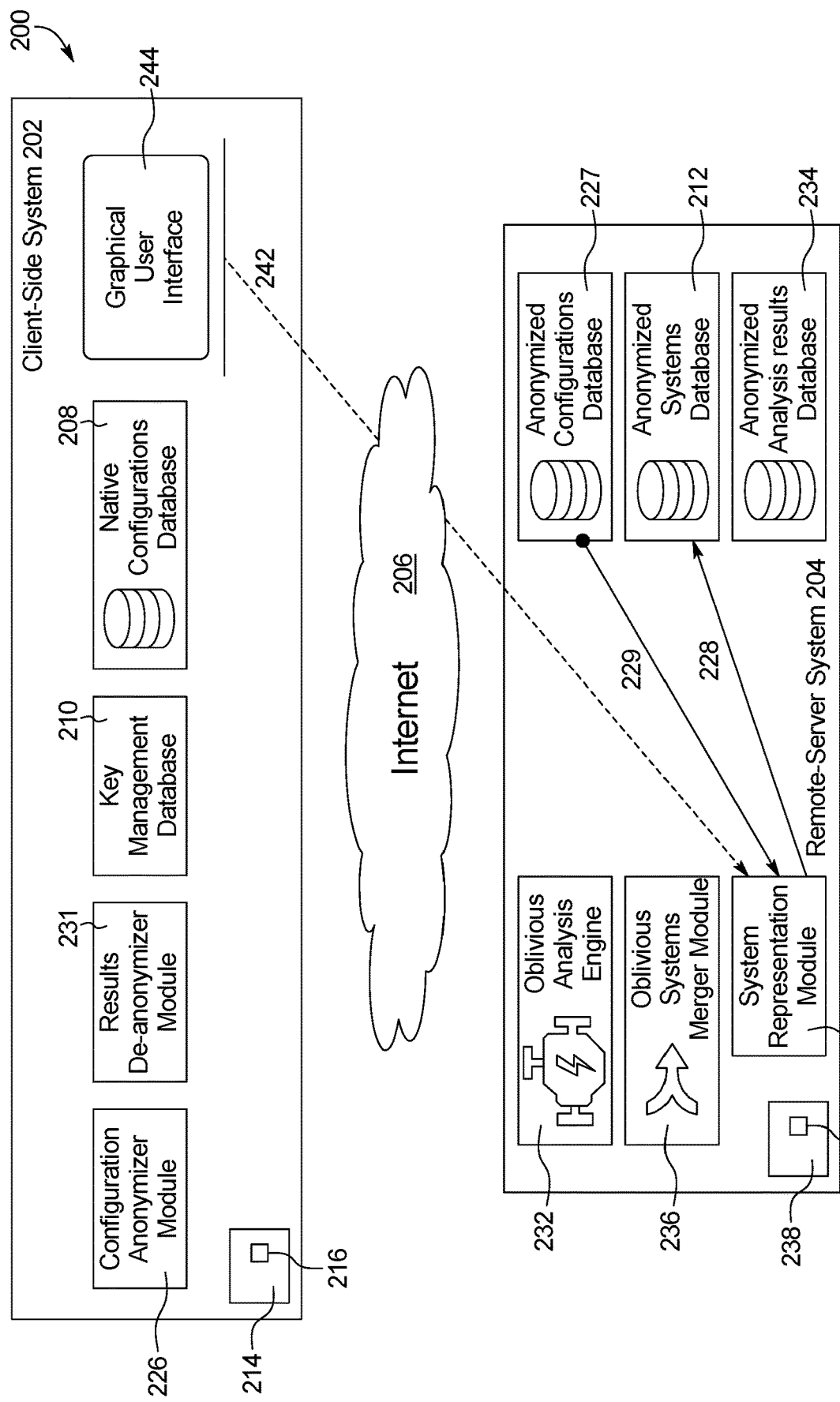
FIG. 8 is a schematic representation of the anonymizing system of FIG. 6 creating an anonymized system representation.

In FIG. 8, the anonymized system 200 generates an anonymized system representation 228 for a set of anonymized configurations 229. Upon receipt of instructions 242 from the graphical user interface 244 on the client-side server 202, the system representation module 222 on the remote server system 204 retrieves the anonymized configuration 229 from the anonymized configurations database 227 and builds an anonymized representation 228 based on the anonymized configuration 229 using object identities that are obtained from the meta-data associated with the anonymized configurations 229. The anonymized system representation 228 is then stored in the anonymized systems database 212 on the remote server system 204.

Figure 9:
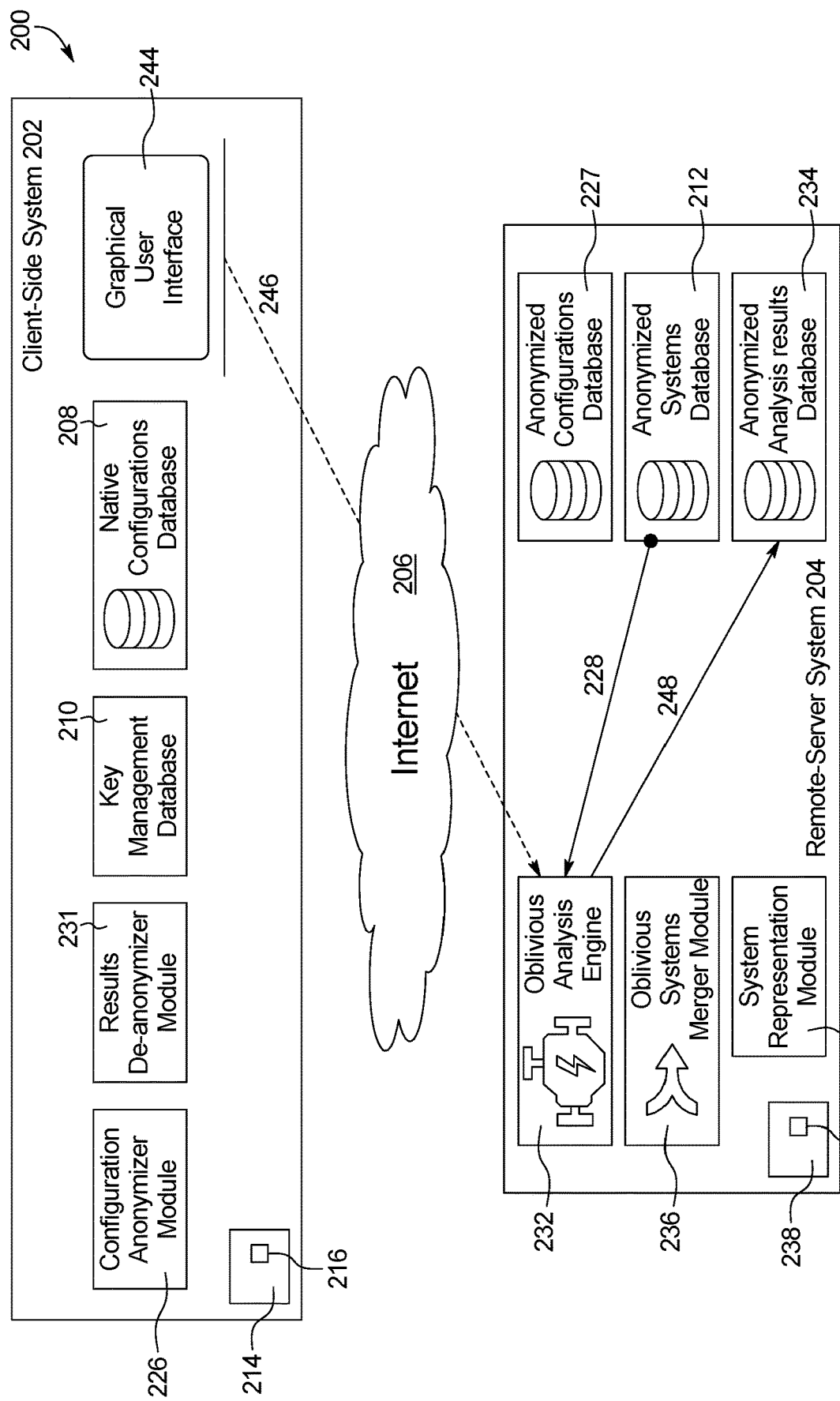
FIG. 9 is a schematic representation of the anonymizing system of FIG. 6 performing an oblivious analysis of the anonymized system representation.

FIG. 9 illustrates the steps undertaken to anonymize the analysis of the anonymizing system 200. Input data 246 received by the client-side GUI 244 triggers the specification of the system 200 and other parameters to be analyzed by the oblivious analysis engine 232, which obtains the specific anonymized representation 228 from the remote anonymized systems database 212. The oblivious analysis engine 232 computes the analysis and stores an anonymized analysis results 248 in the anonymized analysis results database 234.

Figure 10:
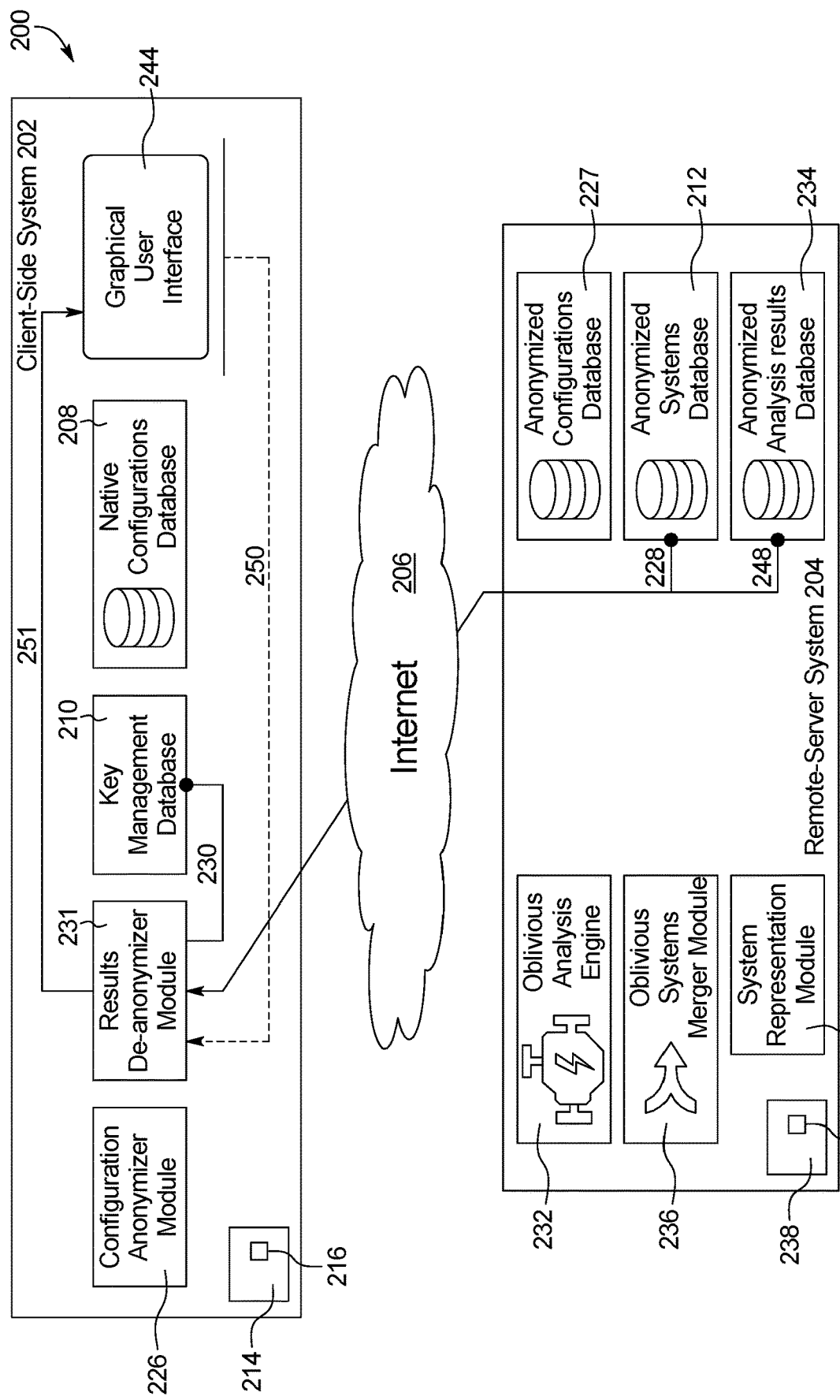
FIG. 10 is a is a schematic representation of the anonymizing system of FIG. 6 de-anonymizing the results of the oblivious analysis of the anonymized system representation.
Figure 11:
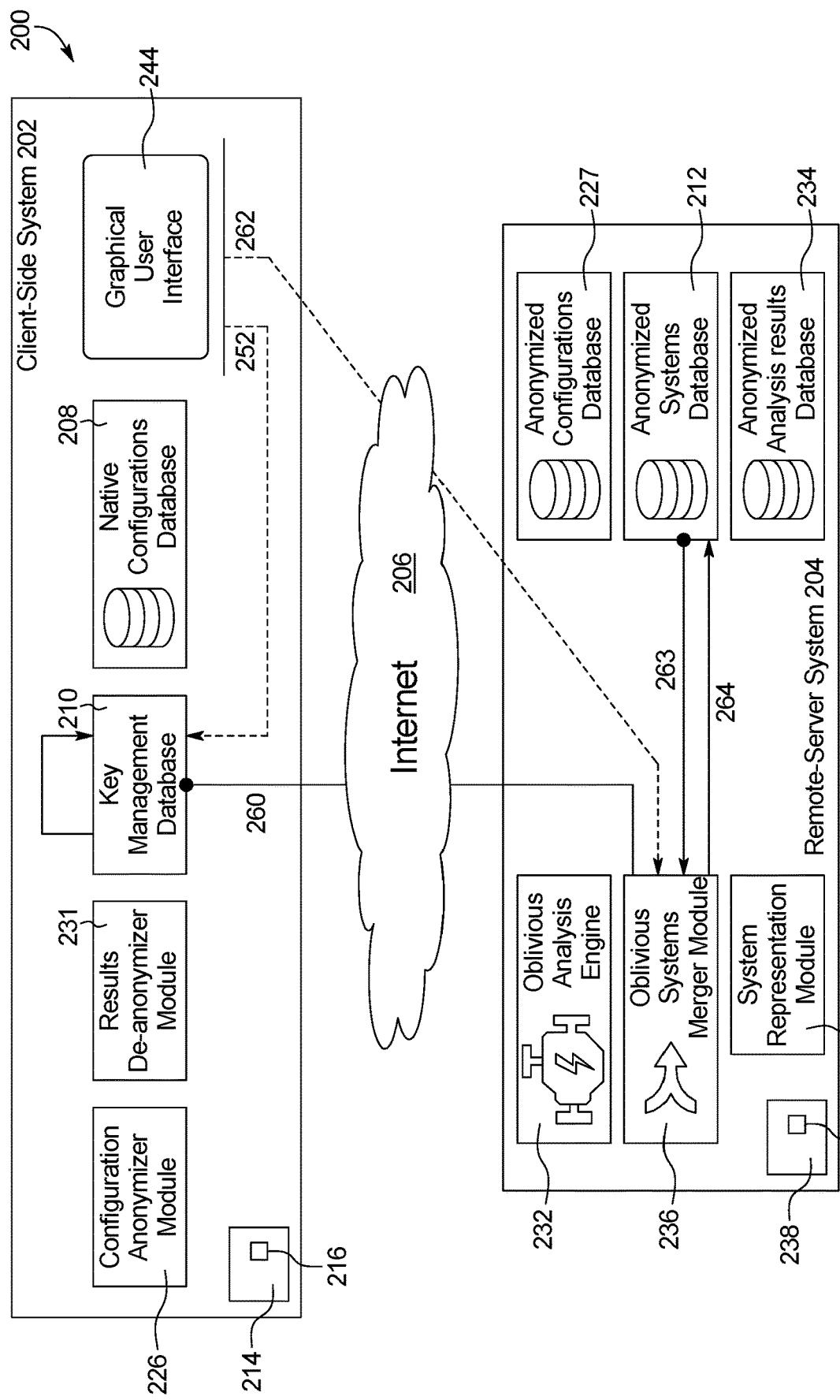
FIG. 11 is a schematic representation of the anonymizing system of FIG. 6 performing an oblivious merge of two anonymized systems into a larger aggregate system.

To de-anonymize the results 248 as shown in FIG. 10, a command 250 is received from the user GUI 244 to perform the de-anonymization. The results de-anonymizer module 231 on the client-side system 202 retrieves the anonymized system representation 228 from the remote anonymized systems database 212, the anonymized analysis results 248 from the anonymized analysis results database 234, and the private de-anonymization key 230 associated with the anonymized configuration 229 from the key management database 210. Using the de-anonymization key 230, the results de-anonymizer module 231 inverts the anonymization performed on the ranges of the anonymized configuration 229 and presents the de-anonymized results 251 to the user via the GUI 244.

In a further embodiment, the anonymizing system 200 merges two anonymized systems into a larger aggregate system. Upon the receipt of instructions 252 to merge two systems from the GUI, the first and second private keys 154, 156 of first and second sets of configurations, respectively, are merged to produce a private anonymization key 258 for the merged system and a public key 260 that identifies the size of each object. The instructions emitted from the GUI also include a command 262 to an oblivious systems merger module 236 to merge the first and second anonymized representations of the first and second sets of configurations, respectively. The oblivious systems merger module 236 retrieves the first and second anonymized representations 263 and the public key 260 from the key management database 110 and produces a merged anonymized system 264 that is stored on the remote anonymized systems database 212.

It is the nature of the anonymized configuration or system representation that the sizes of ranges are publicly known. A netmask for an IP address identifies a CIDR block of a given size containing the IP address. The anonymization system includes an offset that shifts native ranges without creating overlaps. Information about the original offsets is contained if, for example, it is known that if [a,b] is strictly less than [c,d] and the anonymized [a,b] is strictly less (or strictly greater) than the anonymized [c,d]. Information leakage about the original set of range values will be minimized if knowledge of relative positions of the anonymized ranges gives no better information than random chance about the position of the original range. The cryptographically secured identification of an object range gives no better information than random about the original location of the range, which implies that a placement of connected range that is deterministic function of the identifications of the objects it contains will not leak original position information. Cryptographically secure random permutations may also be used.

Aspects of the systems and methods provided herein encompass hardware and software for controlling the relevant functions. Software may take the form of code or executable instructions for causing a processor or other programmable equipment to perform the relevant steps, where the code or instructions are carried by or otherwise embodied in a medium readable by the processor or other machine. Instructions or code for implementing such operations may be in the form of computer instruction in any form (e.g., source code, object code, interpreted code, etc.) stored in or carried by any tangible readable medium.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A system for anonymizing a group of configuration files to provide an anonymized configuration database, the system comprising:
a native configuration database including sets of configuration files, each configuration file including one or more textual descriptions and one or more ranges, wherein each range includes a consecutive sequence of IP addresses, port numbers, or IP addresses and port numbers, wherein the ranges may be contiguous; and
a key management database including a key assigned to each set of configuration files of the native configuration database;
wherein the program instructions, when executed by the processor, permit the processor to execute steps for anonymizing the textual descriptions and the ranges of the native configuration database to provide an anonymized configuration database, and wherein retrieving the textual description and the ranges of the configuration files of the native configuration database from the anonymized configuration database is prevented.

2. The system of claim 1, wherein each range includes a consecutive sequence of IP addresses and port numbers.

3. The system of claim 1, wherein a rule-table is assigned to the set of configuration files, wherein the rule-table includes a plurality of rules that are position-insensitive.

4. The system of claim 3, wherein each range of the anonymized configuration database representation includes the same number of members as the corresponding original range.

5. The system of claim 1, wherein the ranges may be fragmented.

6. The system of claim 1, wherein the step of anonymizing the ranges comprises creating a set of ranges that contain an endpoint but do not begin or end at the endpoint, wherein this set of ranges is created by the steps of:
creating a list of range endpoints;
sorting the list of range endpoints; and
computing, for each endpoint, a set of ranges that contain the endpoint but do not begin or end at the endpoint.

7. The system of claim 6, wherein the memory includes further program instructions executable by the processor that, when executed, cause the processor to offset the set of ranges.

8. The system of claim 1, further comprising a remote anonymized systems database, and wherein the memory includes further program instructions executable by the processor that, when executed, cause the processor to:
build a representation including a plurality of objects;
assign a unique cryptographically secure identity to each object in the representation, each identity derived from the private key; and
transmit the anonymized representation to the remote anonymized systems database.

9. The system of claim 8, further comprising:
a remote anonymized analysis results database; and
a remote oblivious analysis engine in communication with remote anonymized systems database and the remote database of anonymized analysis results; and
a further processor and a further memory coupled to the further processor configured to store further program instructions executable by the further processor,
wherein the further program instructions, when executed by the further processor, cause the further processor to:
receive user input to generate an anonymized analysis of the anonymized representation;
retrieve, by the remote oblivious analysis engine, the anonymized representation from the remote anonymized systems database;
analyze the anonymized representation to develop anonymized analysis results; and
store the anonymized analysis results in the remote anonymized analysis results database.

10. The system of claim 1, further comprising a remote anonymized configurations database, and wherein the memory includes further program instructions executable by the processor that, when executed, cause the processor to transmit the anonymized plurality of objects to the remote anonymized configurations database.

11. The system of claim 10, further comprising:
a remote anonymized analysis results database;
a remote oblivious analysis engine in communication with remote anonymized systems database and the remote database of anonymized analysis results; and
a further processor and a further memory coupled to the further processor configured to store further program instructions executable by the further processor,
wherein the further program instructions, when executed by the further processor, cause the further processor to:
receive user input to generate an anonymized analysis of the anonymized representation;
retrieve, by the remote oblivious analysis engine, the anonymized plurality of objects from the remote anonymized configurations database;
build a representation based on the anonymized plurality of objects;
assign a unique cryptographically secure identity to each object in the representation, each identity derived from the private key; and
transmit the anonymized representation to the remote anonymized systems database.

12. The system of claim 1, wherein the memory includes further program instructions executable by the processor that, when executed, cause the processor to:
generate a de-anonymization key; and
store the de-anonymization key in the key management database.

13. The system of claim 12, wherein the memory includes further program instructions executable by the processor that, when executed, cause the processor to:
receive user input to de-anonymize the anonymized analysis results;
receive, from the remote anonymized analysis results database, the anonymized analysis results and the de-anonymization key from the key management database;
invert the anonymization performed on the representation; and
present the de-anonymized results to the user.

14. A method of anonymizing a group of configuration files for secure transmission from a remote-based analysis system to a user, each configuration file comprising an object, each object containing one or more textual descriptions and one or more ranges of consecutive IP addresses, port numbers, or IP addresses and port numbers, said method comprising the steps of:
  creating a native configuration database comprising sets of configuration files, each configuration file including one or more textual descriptions and one or more ranges of consecutive IP addresses, port numbers, or IP addresses and port numbers;
  assigning a key to the set of configurations, and creating a key management database comprising the keys;
  assigning a unique cryptographically secure identity to each object, each cryptographically secure identity being derived from the key; and
  anonymizing objects with a cryptographically secure identity derived from the key to provide an anonymized group of configuration files, wherein retrieving the textual descriptions and the ranges of the native configuration database from the anonymized configuration database is prevented.

15. The method of claim 14, wherein access to decrypted groups of the anonymized groups of configuration files by a third party is prevented during transmission to and processing by a remote-based analysis system.

16. The method of claim 15 wherein the remote-based analysis system is a cloud based remote analysis system.

17. The method of claim 16 wherein a range-intersection within an anonymized collection of ranges of the IP address, port numbers or IP addresses and port numbers, is identified, and wherein the range-intersection is securely preserved in the anonymized groups of configurations processed by the remote-based analysis system, and the anonymized groups of configurations are processed by the remote-based analysis system to provide a processed anonymized group of configurations to be securely transmitted to the user.

* * * * *

UNITED STATES PATENT AND TRADEMARK OFFICE
CERTIFICATE OF CORRECTION

PATENT NO. : 11,997,203 B2
APPLICATION NO. : 18/133808
DATED : May 28, 2024
INVENTOR(S) : David M. Nicol It is certified that error appears in the above-identified patent and that said Letters Patent is hereby corrected as shown below:

In the Specification

In the Cross-Reference to Related Applications
In Column 1, Line 14, the provisional patent application number:
67/572,517
Should read:
--62/572,517--

Signed and Sealed this
Nineteenth Day of November, 2024

Katherine Kelly Vidal
*Director of the United States Patent and Trademark Office*